(12) United States Patent
Matsuda et al.

(10) Patent No.: US 7,547,407 B2
(45) Date of Patent: Jun. 16, 2009

(54) MANUFACTURING METHOD FOR SINTERED BODY WITH BURIED METALLIC MEMBER

(75) Inventors: Hiroto Matsuda, Ogaki (JP); Kazuhiro Nobori, Handa (JP); Yutaka Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 256 days.

(21) Appl. No.: 11/141,699

(22) Filed: May 31, 2005

(65) Prior Publication Data

US 2006/0012087 A1    Jan. 19, 2006

(30) Foreign Application Priority Data

Jun. 2, 2004    (JP) .......................... P2004-164415

(51) Int. Cl.
B28B 3/02 (2006.01)
B23B 31/28 (2006.01)

(52) U.S. Cl. ...................................... 264/619; 279/128

(58) Field of Classification Search .................. 264/619; 279/128

See application file for complete search history.

(56) References Cited

U.S. PATENT DOCUMENTS 6,084,220 A * 7/2000 Suematsu et al. ........... 219/544
6,744,618 B2 * 6/2004 Divakar et al. ............. 361/234
2001/0043452 A1 11/2001 Divakar

FOREIGN PATENT DOCUMENTS

| EP | 0 914 021 A2 | 5/1999 |
|---|---|---|
| JP | 10-249843 A1 | 9/1998 |
| JP | 10-259059 | 9/1998 |
| JP | 11-312729 | 11/1999 |
| JP | 2001-308163 | 11/2001 |
| JP | 2003-516635 | 5/2003 |

* cited by examiner

Primary Examiner—Steven P Griffin
Assistant Examiner—Russell J Kemmerle, III
(74) Attorney, Agent, or Firm—Burr & Brown

(57) ABSTRACT

A manufacturing method for a sintered body having a metallic member buried therein is provided, and includes forming an alumina sintered body, forming a metallic member by printing a printing paste including a refractory metal on the alumina sintered body, forming a green alumina compact on the metallic member, and sintering the alumina compact, the metallic member, and the alumina sintered body or the alumina presintered body.

9 Claims, 2 Drawing Sheets

MANUFACTURING METHOD FOR SINTERED BODY WITH BURIED METALLIC MEMBER

CROSS REFERENCE TO RELATED APPLICATIONS

This application is based upon and claims the benefit of priority from prior Japanese Patent Application No. P2004-164415, filed on Jun. 2, 2004; the entire contents of which are incorporated herein by reference.

BACKGROUND OF THE INVENTION

1. Field of the Invention

The present invention relates to a manufacturing method for a sintered body with a buried metallic member that may be used for semiconductor manufacturing apparatus or the like.

2. Description of the Related Art

Currently, semiconductor manufacturing apparatus such as a heater, which heats a semiconductor wafer, an electrostatic chuck, which adsorbs and holds the semiconductor wafer, or a susceptor, which is applied a high-frequency voltage, is used in a semiconductor manufacturing process. Dense ceramics such as aluminum nitride, silicon nitride or alumina are noticeable as base materials for such semiconductor manufacturing apparatus.

With the electrostatic chuck, keeping fluctuation in depth of electrostatic chuck electrodes in a ceramic base plate (i.e., difference between the maximum and the minimum depth, which is hereafter referred to as 'evenness') to a minimum is desired. When there is fluctuation in spacing between a chucking surface of an insulative dielectric layer and the electrostatic chuck electrodes, fluctuation in chucking force of the semiconductor wafer on the chucking surface occurs.

In addition, for example, when electrode for plasma generation in the ceramic base plate is slanted with respect to the surface of the ceramic base plate, fluctuation in plasma generation occurs, which adversely affects film formation, and thus fluctuation in film formation occurs. As such, there is demand for securing evenness of metallic member such as electrode in various ceramic members in which the metallic member is buried.

A manufacturing method for a ceramic member, which is made by forming a metallic member on a relatively thin first compact and forming a relatively thick second compact on that metallic member, is disclosed as a technology for improving evenness (e.g., see Japanese Patent Application Laid-open No. Hei 10-249843).

However, very excellent evenness has been recently desired. With the conventional manufacturing method, there are ceramic powders on both surfaces of the metallic member. Consequently, shrinkage is great due to deformation at the time of forming the compact and at the time of sintering, namely densification of the compact. As a result, it is difficult to fulfill the recently desired strict accuracy for evenness.

SUMMARY OF THE INVENTION

An object of the present invention is to provide a manufacturing method for a sintered body with a buried metallic member that allows improvement in evenness of the metallic member.

A manufacturing method for a sintered body with a buried metallic member, according to an embodiment of the present invention, includes forming an alumina sintered body or an alumina presintered body, forming a metallic member by printing a printing paste including a refractory metal on the alumina sintered body or the alumina presintered body, forming an alumina compact on the metallic member, and sintering the alumina compact, the metallic member, and the alumina sintered body or the alumina presintered body.

In this manner, forming the metallic member by printing the printing paste on the alumina sintered body or the alumina presintered body allows little shrinkage due to densification of the alumina compact. Therefore, evenness of the metallic member may be improved.

Figure 1A:
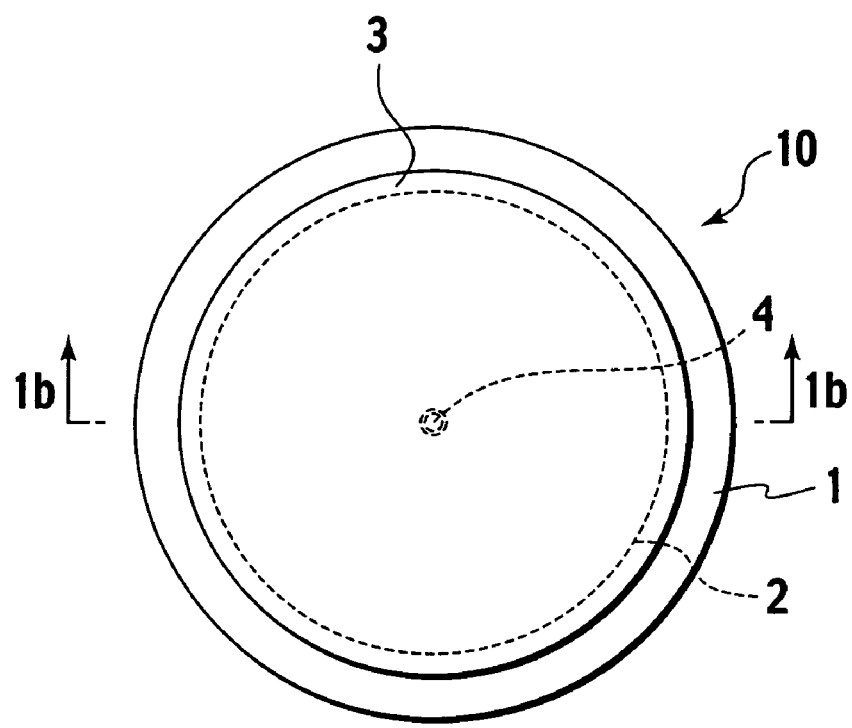
FIG. 1A is a plane view showing an electrostatic chuck, according to an embodiment of the present invention.

DETAILED DESCRIPTION OF THE EMBODIMENTS (Sintered Body with Buried Metallic Member)

A sintered body with a buried metallic member, according to the embodiment of the present invention, is manufactured by forming an alumina sintered body or an alumina presintered body, forming a metallic member by printing a printing paste including a refractory metal on the alumina sintered body or the alumina presintered body, forming an alumina compact on the metallic member, and sintering the alumina compact, the metallic member, and the alumina sintered body or the alumina presintered body.

The alumina compact, the metallic member, and the alumina sintered body or the alumina presintered body are preferably sintered by hot pressing at a sintering temperature of about 1400° C. to about 1650° C. Accordingly, the sintered body with the buried metallic member may be obtained through low temperature sintering, further improving evenness of the metallic member.

A melting point of the metallic member is preferably equal to or greater than about 1650° C., and a difference in thermal expansion coefficient between the metallic member and an alumina is preferably equal to or less than about $5 \times 10^{-6}$/K. Accordingly, evenness of the metallic member can be improved. Furthermore, the sintered body with the buried metallic member available as a semiconductor manufacturing apparatus for high temperature application such as thermal CVD can be provided.

The metallic member can include at least one of molybdenum (Mo), tungsten (W), molybdenum carbide, tungsten carbide, a tungsten-molybdenum alloy (W/Mo alloy), hafnium (Hf), titanium (Ti), tantalum (Ta), rhodium (Rh), rhenium (Re), platinum (Pt), and niobium (Nb), for example.

The printing paste preferably includes about 5 to about 30% by weight alumina. Accordingly, the adhesiveness between the alumina sintered body and the metallic member may be strengthened. More specifically, the interface shear strength between the alumina sintered body and the metallic member may be improved. In addition, use of less than 30% by weight alumina does not adversely affect the conduction of the metallic member.

The alumina compact preferably includes a binder. Accordingly, components of the metallic member may be prevented from diffusing to the alumina sintered body.

A purity of an alumina powder for the alumina sintered body, the alumina presintered body and the alumina compact is preferably equal to or greater than about 99.5%. Accordingly, the alumina purity is kept high and concentration of a source of contamination for a substrate is kept low, thus preventing contamination of the substrate.

The alumina compact is preferably formed by pressing an alumina powder filled on the metallic member in a metal mold.

Accordingly, the sintered body with the buried metallic member is preferably manufactured by forming an alumina sintered body or an alumina presintered body, printing a printing paste including a refractory metal on the alumina sintered body or the alumina presintered body, forming an alumina compact by pressing an alumina powder filled on the printing paste in a metal mold, and then sintering the alumina compact, the printing paste, and the alumina sintered body or the alumina presintered body, which are integrated.

The sintered body with the buried metallic member is preferably a heater, an electrostatic chuck, or a susceptor. This increases accuracy in processes such as film formation and etching.

An electrostatic chuck is described as an example of the sintered body with the buried metallic member, according to the embodiment of the present invention.

(Electrostatic Chuck)

Figure 1B:
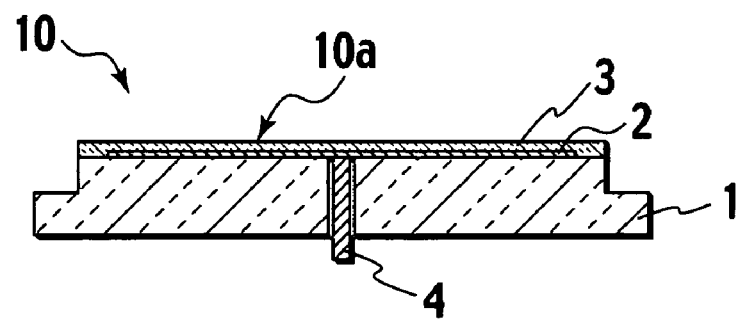
FIG. 1B is a cross-sectional view taken along line 1b-1b of FIG. 1A.

FIGS. 1A and 1B are a plane view and a cross-sectional view showing a structure of an electrostatic chuck 10, according to the embodiment of the present invention. The electrostatic chuck 10 includes a ceramic base plate 1 formed into a disc shape, a thin ceramic dielectric layer 3 placed on the ceramic base plate 1, and a planar electrode 2 buried between the ceramic dielectric layer 3 and the ceramic base plate 1. The surface of the ceramic dielectric layer 3 is a substrate-placing surface 10a. A substrate such as a semiconductor wafer or a liquid crystal substrate is placed and fixed on the substrate-placing surface 10a. The electrostatic chuck 10 is preferably a coulomb electrostatic chuck using an alumina sintered body as the ceramic dielectric layer 3 with extremely high resistance to a wide temperature range.

The ceramic base plate 1 is formed using an alumina sintered body resulting from sintering an alumina powder. The ceramic dielectric layer 3 is also formed using an alumina sintered body. An alumina sintered body has thermal shock resistance may be provided so as to prevent breakdown due to rapid temperature change. The alumina powder used in forming of the alumina sintered body is preferably mixed with a binder. Furthermore, the alumina powder used for the ceramic dielectric layer 3 and the ceramic base plate 1 preferably has purity equal to or greater than about 99.5%. When the purity is high, equal to or greater than about 99.5%, the concentration of a source of contamination for the substrate such as a semiconductor wafer or a liquid crystal substrate can be kept low. This prevents contamination of the substrate. Therefore, this prevents contamination of semiconductor devices and the like which are obtained from the substrate. Furthermore, a dense alumina sintered body having excellent corrosion resistance and a flexural strength of about 300 MPa or greater may be obtained. Therefore, cracks and chips are difficult to generate when perforating or while in use, and generation of particles can be prevented.

The electrode 2 includes a refractory metal. A melting point of the electrode 2 is preferably equal to or greater than about 1650° C., and a difference in thermal expansion coefficient between the electrode 2 and an alumina is preferably equal to or less than about $5\times10^{-6}$/K. The electrode 2 may include one or more of molybdenum (Mo), tungsten (W), molybdenum carbide, tungsten carbide, a tungsten-molybdenum alloy (W/Mo alloy), hafnium (Hf), titanium (Ti), tantalum (Ta), rhodium (Rh), rhenium (Re), platinum (Pt), and niobium (Nb), for example.

The electrode 2 may be a printed electrode formed by printing, drying and sintering a metallic paste (printing paste). Furthermore, the electrode 2 may be a thin film electrode formed by physical vapor deposition such as sputtering or ion beam deposition, or chemical vapor deposition such as CVD. Moreover, that thin film electrode may be patterned by etching to form the electrode 2.

Note that in the case of forming the printed electrode using a printing paste, an alumina powder may be mixed in with the printing paste since the thermal expansion coefficient thereof can approach that of the surrounding alumina sintered body. In this case, the printing paste preferably includes about 5 to about 30% by weight alumina. This can control the heat shrinkage of the printing paste occurred when sintering. In addition, the adhesiveness of the electrode 2 with the ceramic base plate 1 and the ceramic dielectric layer 3, which are an alumina sintered body, can be strengthened. More specifically, the interface shear strength between the alumina sintered body and the electrode 2 may be improved. Furthermore, use of less than 30% by weight alumina does not adversely affect the conduction of the electrode 2.

The electrode 2 is preferably completely buried in the joined body of the ceramic base plate 1 and the ceramic dielectric layer 3, structured to not be exposed to the outside. This allows favorable use of the electrostatic chuck 10 in a corrosive gas atmosphere.

In addition, the ceramic base plate 1, the electrode 2, and the ceramic dielectric layer 3 are preferably integrated by hot press sintering. By integrating through hot press sintering, the joining surface of the ceramic base plate 1 and the ceramic dielectric layer 3 can be joined without using an adhesive layer or the like therebetween, and they can be almost completely integrated without the joining interface. As a result, the buried electrode 2 can be blocked off from the external atmosphere, and can maintain high corrosion resistance for use in a corrosive gas.

(Manufacturing Method)

Figure 2A:
FIGS. 2A through 2C show a manufacturing method for the electrostatic chuck, according to the embodiment of the present invention.
Figure 2B:
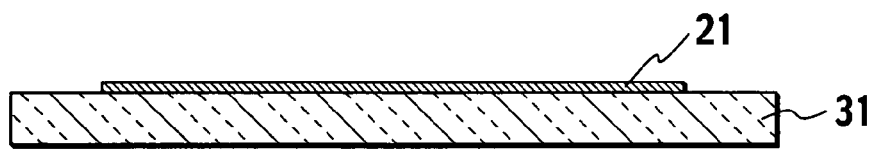
Figure 2C:
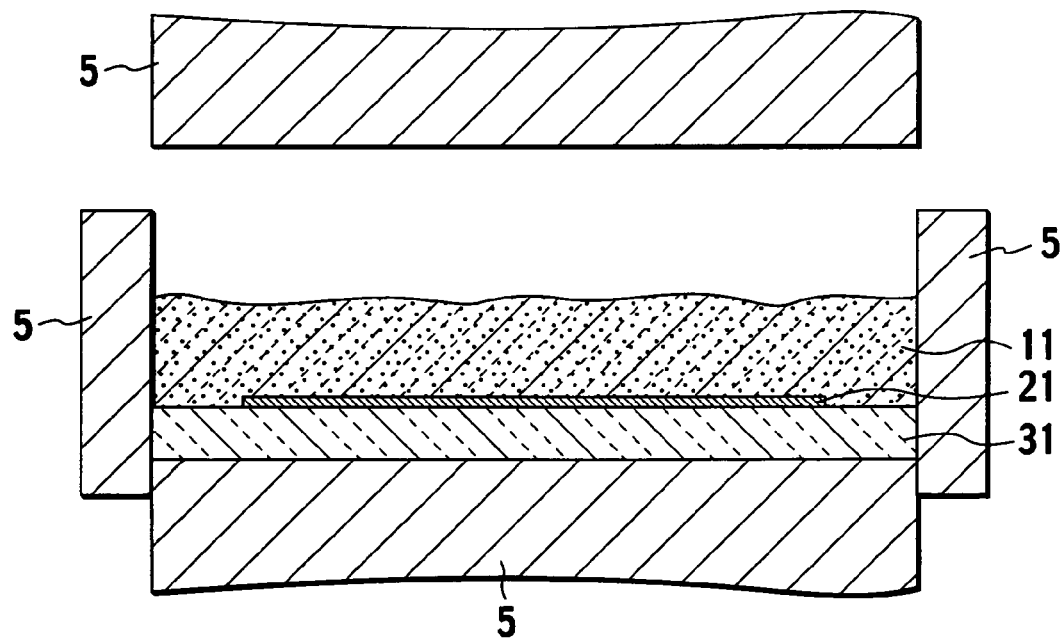

Next, an example of a manufacturing method for the electrostatic chuck 10 is described as the manufacturing method for the sintered body with the buried metallic member, according to the embodiment of the present invention, with reference to FIGS. 2A through 2C.

First, as shown in FIG. 2A, a disc-shaped alumina compact is sintered, forming an alumina sintered body 31. An alumina presintered body may be formed instead of the alumina sintered body 31. While this alumina sintered body 31 ultimately becomes the ceramic dielectric layer 3, the thickness of the alumina sintered body 31 is preferably made thicker than the final ceramic dielectric layer 3 so as to give it sufficient strength for a succeeding grinding step, hot press sintering step, and the like. For example, it may be several to 10 mm thick in the case of ultimately forming a 0.5-mm-thick ceramic dielectric layer.

In order to forming the alumina sintered body 31, ceramic powder with alumina as a main component is prepared. This ceramic powder may include a sintering aid powder such as MgO in addition to the alumina powder. However, it preferably makes up about 99.5% by weight or greater of the alumina powder. Furthermore, use of an alumina powder having purity equal to or greater than about 99.5% is preferred. Accordingly, the alumina purity is kept high and concentration of a source of contamination in a substrate such as a semiconductor wafer or a liquid crystal substrate is kept low, thereby preventing contamination of the substrate. A binder is blended with the ceramic powder at a predetermined compounding ratio and mixed using a trommel or the like, providing slurry. The slurry is then dried, providing granules.

A disc-shaped alumina compact is then formed using a forming method such as a metal mold forming, cold isostatic pressing (CIP) or slip casting. The alumina compact can be sintered for approximately 2 to 6 hours in air or an inert gas at approximately 1600 to 1700° C. by atmospheric sintering, for example. The alumina sintered body 31 is provided in this manner. Note that a method other than atmospheric sintering is also available as the sintering method.

For example, if the alumina sintered body 31 is formed by sintering through hot pressing or HIP, pores and defects during sintering further decrease than with atmospheric sintering, and is very favorable as the ceramic dielectric layer 3. While the applied voltage is high for the Coulomb electrostatic chuck in order to obtain the same chucking force as with a Johnson-Rahbeck (JR) electrostatic chuck, and the pores in the sintered body become cause for a dielectric breakdown, such concern may decrease. For example, while the withstand voltage for an alumina sintered body formed even by atmospheric sintering may be set as approximately 1.5to 3kV/mm, an alumina sintered body formed by hot press sintering surely acquires a withstand voltage of about 3 kV/mm.

Next, as shown in FIG. 2B, one side of the alumina sintered body 31 is polished to form a smooth surface. A printing paste including one or more of molybdenum (Mo), tungsten (W), molybdenum carbide, tungsten carbide, a tungsten-molybdenum alloy (W/Mo alloy), hafnium (Hf), titanium (Ti), tantalum (Ta), rhodium (Rh), rhenium (Re), platinum (Pt), and niobium (Nb) as a refractory material is printed by a printing method such as screen printing and then dried on that smooth surface. This forms a planar printed electrode 21 (unsintered).

The printing paste preferably includes 5 to 30% by weight alumina. This can control the heat shrinkage of the printing paste occurred when sintering. In addition, the ceramic dielectric layer 3 or the ceramic base plate 1, which is an alumina sintered body, and can be strongly joined to the electrode 2. More specifically, the interface shear strength between the alumina sintered body and the electrode 2 can be improved. In addition, use of 30% or less by weight alumina does not adversely affect the conduction of the electrode 2. Note that a thin film electrode may be formed as the electrode 2 by physical vapor deposition such as sputtering or ion beam deposition, or chemical vapor deposition such as CVD. Moreover, that thin film electrode may be patterned by etching to form the electrode 2.

Next, as shown in FIG. 2C, for example, the alumina sintered body 31 is placed so as for the surface on which the printed electrode 21 (unsintered) is formed to be exposed to a metal mold 5. An alumina powder is then filled in the metal mold 5 from above the printed electrode 21 (unsintered). For example, granules prepared by drying a ceramic powder made of a mixture of an alumina powder and a sintering aid is filled in. The purity of the alumina powder may be lower than the alumina powder used for the alumina sintered body 31, but preferably has a purity of about 99.5% or greater.

An alumina compact 11 is then formed on the printed electrode 21 (unsintered) by metal mold forming using the metal mold 5. At the same time, the alumina sintered body 31, the printed electrode 21 (unsintered), and the alumina compact 11 made of an alumina powder are integrated.

The alumina compact 11, the printed electrode 21 (unsintered), and the alumina sintered body 31, which are integrated, are then sintered by hot pressing while being applied pressure in a uniaxial direction. Sintering conditions are not particularly limited, but sintering is preferably carried out at about 1400 to about 1650° C. More preferably, sintering is carried out for approximately 1 to 4 hours in a reduced pressure inert gas atmosphere such as nitrogen or argon, or a reducing atmosphere. In this manner, the alumina compact 11, the printed electrode 21 (unsintered), and the alumina sintered body 31 are integrated, providing an integrated sintered body including an alumina sintered body, which becomes the ceramic base plate 1, the electrode 2, and the alumina sintered body 31, which becomes the ceramic dielectric layer 3. As a result, the alumina sintered body 31 is subjected to two sintering processes.

It is then preferable to grind the alumina sintered body 31 to adjust the thickness thereof to be from about 0.05 to about 0.5 mm. In addition, sides of the alumina sintered body 31 may be ground to narrow the area of the substrate-placing surface 10a. Furthermore, a hole is formed for inserting a terminal 4 connected to the electrode 2, forming an alumina sintered body, which is the ceramic base plate 1. A ceramic tubular member which covers the periphery of the terminal 4 may be inserted into that hole, joined and ground.

The terminal 4 is connected to the electrode 2. A part of the terminal 4 extends to the outside of the ceramic base plate 1. In this manner, the electrostatic chuck 10 including the ceramic dielectric layer 3 made of alumina sintered body, the electrode 2, and the ceramic base plate 1 made of alumina sintered body, as shown in FIG. 1B.

According to such manufacturing method for a sintered body with the buried metallic member, more specifically the electrostatic chuck 10, forming the electrode 2 as the metallic member by printing the printing paste on the alumina sintered body or the alumina presintered body allows little shrinkage due to densification of the alumina compact. Therefore, evenness of the electrode 2 may be improved. Furthermore, a very even ceramic dielectric layer 3 may be obtained. In this case, the alumina sintered body 31 or the alumina presintered body is subjected to two sintering processes.

Moreover, since the alumina sintered body 31, the printed electrode 21 (unsintered), and the alumina compact 11 are integrated by forming and hot press sintering, the electrostatic chuck 10 may be provided without a joining layer. Through hot press sintering, sintering is possible at a low temperature of about 1400 to about 1650° C. even when an extremely pure ceramic powder is used. As a result, evenness of the electrode 2 can be further improved.

In addition, use of the alumina powder to form the alumina compact 11 provides a favorable join to the alumina sintered body 31, thereby providing an integrated sintered body with hardly any joining interface. Therefore, even if used in a corrosive gas atmosphere, gas does not penetrate from the junction, preventing corrosion of the electrode 2.

The main component of the electrode 2 is a refractory metal. And the electrode 2 has a melting point of about 1650° C. or greater and a difference in thermal expansion coefficient from alumina being about $5\times10^{-6}$/K or less. More specifically, the electrode 2 can include at least one of molybdenum (Mo), tungsten (W), molybdenum carbide, tungsten carbide, a tungsten-molybdenum alloy (W/Mo alloy), hafnium (Hf), titanium (Ti), tantalum (Ta), rhodium (Rh), rhenium (Re), platinum (Pt), and niobium (Nb). Accordingly, evenness of the electrode 2 can be further improved. Furthermore, the electrostatic chuck 10 available as a semiconductor manufacturing apparatus for high temperature application such as thermal CVD can be provided.

Furthermore, since the printing paste includes about 5 to about 30% by weight alumina, the ceramic base plate 1 and the ceramic dielectric layer 3 can be strongly joined to the electrode 2. Therefore, the interface shear strength between the ceramic base plate 1 and the electrode 2 and the interface shear strength between the ceramic dielectric layer 3 and the electrode 2 can be improved. In addition, use of less than 30% by weight alumina does not adversely affect conduction of the electrode 2.

Since a binder is mixed with the alumina powder which is a raw material powder for the alumina compact 11, diffusion of components of the electrode 2 to the ceramic base plate 1 and the ceramic dielectric layer 3 may be prevented. Particularly, diffusion can be prevented when the electrode 2 is made of tungsten.

Furthermore, since the purity of the alumina powder used for the alumina sintered body 31 and the alumina compact 11 is about 99.5% or greater, which is high, concentration of a source of contamination for a substrate such as a semiconductor wafer or a liquid crystal substrate is kept low, thus preventing contamination of the substrate. Therefore, this prevents contamination of semiconductor devices and the like which are obtained from the substrate.

Furthermore, with the above manufacturing method, the alumina sintered body 31 is formed independently, one side thereof is polished to form a smooth surface, and the electrode 2 is formed thereupon. In addition, hot press sintering is carried out, and final adjustment of the thickness of the ceramic dielectric layer 3 may be carried out by grinding. Accordingly, control of the thickness of the ceramic dielectric layer 3 may be reliably carried out with high accuracy. Therefore, chucking force on the substrate-placing surface 10a may be uniform.

Therefore, by setting the thickness of the ceramic dielectric layer 3 in the coulomb electrostatic chuck 10 to be very thin, about 0.5 mm or less, high chucking force can be achieved, and uniform chucking force on the substrate-placing surface 10a may be achieved by making the thickness of the ceramic dielectric layer 3 uniform.

According to such manufacturing method, fluctuation in distance from the substrate-placing surface 10a of the electrostatic chuck 10 to the electrode 2 (difference between the maximum and the minimum distance from the substrate-placing surface 10a to the electrode 2), namely evenness of the electrode 2 may be controlled to about 0.2 mm or less, for example. In this manner, the manufacturing method of this embodiment can fulfill the recently desired strict accuracy for evenness and improve evenness of the electrode 2.

MODIFIED EXAMPLE

Although the inventions have been described above by reference to certain embodiments of the inventions, the inventions are not limited to the embodiments described above. Modifications and variations of the embodiments described above will occur to those skilled in the art, in light of the above teachings.

For example, with the manufacturing method for the electrostatic chuck 10 of the above embodiment, the ceramic base plate 1 is formed by hot press sintering; however, it may be formed by atmospheric sintering, and the alumina sintered body 31, which becomes the ceramic dielectric layer 3, may be sintered by hot press sintering. For example, once the alumina sintered body 31, which becomes the ceramic dielectric layer 3, is provided by hot press sintering, the electrode 2 is formed on a surface thereof by printing or vapor deposition, and the separately formed alumina sintered body, which becomes the ceramic base plate 1, may be adhered to the alumina sintered body 31 using an adhesive.

In addition, the electrostatic chuck 10 has been exemplified as a sintered body with a buried metallic member; however, a sintered body with a buried metallic member may be manufactured singly or in combination with another member.

For example, it may be used for a manufacturing method for a susceptor, a heater, ring member, dome member, or various members having heat resistance and corrosion resistance used in a semiconductor manufacturing apparatus. More specifically, it can be applied to a manufacturing method for a sintered body with a buried metallic member such as a heater, an electrostatic chuck, a susceptor applied a high frequency, or the like used in a semiconductor manufacturing apparatus such as a thermal CVD apparatus or an etching apparatus. There are semiconductor manufacturing apparatus available for various semiconductor manufacturing processes such as semiconductor wafer transfer, exposure, forming a film such as chemical vapor-phase growth, physical vapor-phase growth, and sputtering, micro fabrication, cleaning, plasma etching, and dicing, and can be applied to a manufacturing method for various members used for these processes.

For example, in the case of manufacturing a heater, a resistance heating element may be used as the metallic member instead of the electrode 2. Fluctuation in distance from a substrate-placing surface of the heater to the resistance heating element (difference between the maximum and the minimum distance from the substrate-placing surface of the heater to the resistance heating element), namely evenness of the resistance heating element may be controlled to about 0.2 mm or less, for example. As a result, the substrate may be heated uniformly.

Furthermore, in the case of manufacturing a susceptor, a high frequency applied electrode may be used as the metallic member. Fluctuation in distance from a substrate-placing surface of the susceptor to the high frequency applied electrode (difference between the maximum and the minimum distance from the substrate-placing surface of the susceptor to the high frequency applied electrode), namely evenness of the high frequency applied electrode may be controlled to about 0.2 mm or less, for example. As a result, plasma may be generated uniformly.

EXAMPLES

Working examples of the present invention are described. The present invention is naturally not limited to the following working examples.

<Evaluation of Printing Paste and Binder Addition>

First, a manufacturing method for an electrostatic chuck 10 of working examples 1 through 6 is described. An alumina powder having purity equal to 99.5% (grain diameter 1 $\mu$m) and a MgO powder, which is a sintering aid, are used as the ceramic powder. Note that the MgO content in the ceramic powder is 0.04% by weight. Polyvinyl alcohol, which is a binder, water, and a dispersant are added to this ceramic powder and mixed for 16 hours using a trommel, forming slurry. The resulting slurry is spray dried using a spray dryer, forming an average of approximately 80 $\mu$m granules. Next, the granules are inserted in a rubber mold and formed into an alumina compact by a cold isostatic pressing (CIP) apparatus under pressure of 1 ton/cm$^2$. Once this alumina compact is dried, the alumina compact is placed in an alumina case and sintered in an atmospheric sintering furnace.

Sintering conditions are increasing 10° C. per hour from room temperature to 500° C., maintaining 500° C. for 5 hours for removing the binder, and then increasing 30° C. per hour from 500° C. to 1650° C., and maintaining for 4 hours. The alumina sintered body 31 shown in FIG. 2A is provided in this manner.

Next, the alumina sintered body 31 is ground to form a disc 215 mm in diameter and 4 mm in thickness. At this time, a surface is polished to finish a smooth surface with a roughness Ra of 0.8 μm or less.

For respective working examples 1 through 6, ethylcellulose is mixed as a binder with printing paste materials given in Table 1, forming a printing paste. A printed electrode 21 (unsintered) 195 mm in diameter and 20 μm in thickness is formed on the smooth surface of the alumina sintered body 31 as shown in FIG. 2B by screen printing using the printing paste and then dried.

Afterwards, the alumina sintered body 31 on which the printed electrode 21 is formed is placed in a metal mold, a separately prepared a raw material powder including an alumina powder having purity equal to 99.5% is filled therein, and is pressed with pressure of 200 kg/cm². Note that the filled raw material powder includes a binder in working examples 1 through 3, however, it does not include a binder in working examples 4 through 6, as given in Table 1.

Next, this compact is placed in a carbon case and hot press sintered. Sintering is carried out in a nitrogen pressurized atmosphere (150 kPa) under a pressure of 100 kg/cm², the temperature is increased 300° C. per hour, and is maintained at 1600° C. for 2 hours. In this manner, an integrated sintered body including the alumina sintered body, which becomes the ceramic base plate 1, the electrode 2, and the alumina sintered body 31, which becomes the ceramic dielectric layer 3, is obtained. In other words, an integrated sintered body with the buried electrode is obtained.

The surface of the alumina sintered body 31 sintered twice is then ground to a flat surface by a diamond grindstone, making the thickness, namely the thickness from the embedded electrode 2 to the surface of the alumina sintered body 31 be 0.3 mm. Side surfaces of the alumina sintered body 31 are then ground. Furthermore, a hole is formed in the ceramic base plate 1, a ceramic tubular member covering the periphery of the terminal 4 to be connected to the electrode 2 is joined, and the terminal 4 and the electrode 2 are connected, completing the electrostatic chuck 10.

In this manner, by varying material of printing paste and varying whether a binder is mixed or not mixed (with or without a binder) with the alumina powder for manufacturing the alumina compact 11, the electrostatic chuck 10 is manufactured according to the procedures of FIGS. 2A through 2C as working examples 1 through 6.

(Evaluation)

Volume resistivity of the ceramic dielectric layer 3 made of the alumina sintered body 31 and interface shear strength of the electrode 2 with the ceramic base plate 1 are measured. In addition, diffusion to the ceramic dielectric layer 3 is observed. Specific evaluation methods are described forthwith.

(1) Volume resistivity: measured using a method in conformance with JIS C2141 at room temperature in a vacuum atmosphere. The specimen is shaped 50 mm in diameter and 1 mm in thickness. Each electrode is made of silver paste and has a 20 mm main electrode diameter, a 30 mm guard electrode internal diameter, a 40 mm guard electrode external diameter, and a 45 mm applied electrode diameter. Current is read one minute after application of 1000 V/mm, and then the volume resistivity is calculated.

(2) Interface shear strength: measured by a micro-droplet method. The composite material interface characteristics evaluating apparatus (manufactured by Tohei Sangyo Corporation) is used as the measuring apparatus. Note that a disc 12 mm in thickness and 9.9 mm in diameter is cut from a manufactured electrostatic chuck, and interface shear strength thereof is measured.

Evaluation results of working examples 1 through 6 are given in Table 1.

TABLE 1

| | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 |
|---|---|---|---|---|---|---|
| BINDER | WITH | | | WITHOUT | | |
| PRINTING PASTE | Mo, W | MoC, WC | W, $Al_2O_3$ | Mo, W | MoC, WC | W, $Al_2O_3$ |
| DIFFUSION STATE | DIFFUSION | NO DIFFUSION | NO DIFFUSION | DIFFUSION | NO DIFFUSION | DIFFUSION |
| VOLUME RESISTIVITY ($\Omega \cdot cm$) | $1 \times 10^{12}$ | $1 \times 10^{17}$ | $1 \times 10^{17}$ | $1 \times 10^{12}$ | $1 \times 10^{17}$ | $1 \times 10^{12}$ |
| INTERFACE SHEAR STRENGTH (MPa) | 100 | 0 | 130~300 | 80 | 30 | 80~150 |

Comparing working examples 1 through 3 and working examples 4 through 6, working examples 2 and 3 in which an alumina compact including a binder mixed with the alumina powder have less diffusion of components of electrode 2 to the ceramic dielectric layer 3. As a result, working examples 2 and 3 allowed increase in volume resistivity. Furthermore, even working example 5 in which MoC and WC are used in the printing paste shows less diffusion of components of electrode 2 to the ceramic dielectric layer 3, and volume resistivity is high. Moreover, working examples 3 and 6 in which alumina is added to the printing paste show extremely high interface shear strength.

Therefore, it is understood that a printing paste including tungsten and alumina, and a raw material powder including a binder and an alumina powder is particularly favorable.

<Evaluation of Alumina Addition Ratio>

(Manufacturing Conditions)

Electrostatic chucks having the amount of alumina added to the printing paste of working example 3 varied as given in Table 2 are manufactured (working examples 7 through 11), and volume resistivity and interface sheath strength are measured.

Manufacturing conditions and evaluation methods of working examples 7 through 11 are the same as the above-given working example 3 aside from varying the alumina addition amount, and thus descriptions thereof are omitted here.

(Evaluation)

Evaluation results are given in Table 2.

TABLE 2

|  | WORKING EXAMPLE 7 | WORKING EXAMPLE 8 | WORKING EXAMPLE 9 | WORKING EXAMPLE 10 | WORKING EXAMPLE 11 |
|---|---|---|---|---|---|
| ALUMINA ADDITION AMOUNT (wt %) | 0 | 5 | 10 | 20 | 30 |
| VOLUME RESISTIVITY ($\Omega \cdot cm$) | $1 \times 10^{12}$ | $1 \times 10^{17}$ | $1 \times 10^{17}$ | $1 \times 10^{17}$ | $1 \times 10^{17}$ |
| INTERFACE SHEAR STRENGTH (MPa) | 100 | 130 | 200 | 250 | 300 |

Working examples 8 through 11 in which the alumina addition amount is 5 to 30% by weight favorably show high volume resistivity and interface shear strength of 130 MPa or greater. In addition, adding 5 to 20% by weight alumina is preferred to maintain further favorable conduction of the electrode 2.

<Comparison of Using a Compact and Using a Sintered Body>

Next, the electrostatic chuck 10 is manufactured using conventionally used alumina compacts in comparative examples 1 through 5 and alumina sintered bodies in working examples 12 through 16 to form the ceramic dielectric layer 3. In other words, for comparative examples 1 through 5, the ceramic dielectric layer 3 is formed using an alumina compact made of an alumina powder instead of the alumina sintered body 31, as in FIG. 2A. The rest is the same as with working example 3. In working examples 12 through 16, the ceramic dielectric layer 3 is formed using the alumina sintered body 31 as shown in FIG. 2A through the same process as in working example 3.

In addition, the sintering temperature is varied. More specifically, the sintering temperature when sintering to obtain the integrated ceramic dielectric layer 3, electrode 2, and ceramic base plate 1 is varied as given in Table 3. The thickness of the ceramic dielectric layer 3, namely difference between the maximum and the minimum distance from the substrate-placing surface 10a to the electrode 2 is measured as evenness.

Manufacturing conditions and evaluation results are given in Table 3.

TABLE 3

|  | USING COMPACT | | | | |
|---|---|---|---|---|---|
|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
| SINTERING TEMPERATURE (° C.) | 1350 | 1400 | 1600 | 1650 | 1700 |
| EVENNESS (mm) | 0.51 | 0.20 | 0.34 | 0.46 | 0.50 |
|  | USING SINTERED BODY | | | | |
|  | WORKING EXAMPLE 12 | WORKING EXAMPLE 13 | WORKING EXAMPLE 14 | WORKING EXAMPLE 15 | WORKING EXAMPLE 16 |
| SINTERING TEMPERATURE (° C.) | 1350 | 1400 | 1600 | 1650 | 1700 |
| EVENNESS (mm) | 0.19 | 0.05 | 0.12 | 0.15 | 0.20 |

Evenness in comparative examples 1 through 5 in which alumina compacts are used was large, 0.20 to 0.5 mm. Evenness in comparative examples 12 through 16 in which alumina sintered bodies are used is kept small, 0.05 to 0.20 mm. Accordingly, a manufactured electrostatic chuck using the alumina sintered body is understood to have little fluctuation in distance between the electrode 2 and the substrate-placing surface 10a of the ceramic dielectric layer 3. Particularly, it is understood that using a low temperature of 1400 to 1650° C. as the sintering temperature allows further improvement in evenness.

What is claimed is:

1. A manufacturing method for a sintered body having a metallic member buried therein, comprising:
    forming an alumina sintered body having a first surface and an opposed second surface;
    polishing the opposed second surface of the alumina sintered body;

forming a metallic member by printing a printing paste including a refractory metal on the polished second surface of the alumina sintered body;

forming a green alumina compact on the metallic member;

hot pressing the green alumina compact, the metallic member, and the alumina sintered body to sinter the green alumina compact, the metallic member and the alumina sintered body together to form a sintered body having the metallic member buried therein; and grinding the first surface of the alumina sintered body to adjust a thickness thereof, thereby forming a substrate-placing surface of the sintered body.

2. The manufacturing method according to claim 1, wherein the sintered body having the metallic member buried therein is one of a heater, an electrostatic chuck, and a susceptor.

3. The manufacturing method according to claim 1, wherein a melting point of the metallic member is greater than or equal to about 1650° C, and a difference between a thermal expansion coefficient of the metallic member and a thermal expansion coefficient of alumina for the alumina sintered body and the green alumina compact is less than or equal to about $5 \times 10^{-6}$/K.

4. The manufacturing method according to claim 3, wherein the metallic member includes at least one of molybdenum, tungsten, molybdenum carbide, tungsten carbide, a tungsten-molybdenum alloy, hafnium, titanium, tantalum, rhodium, rhenium, platinum, and niobium.

5. The manufacturing method according to claim 1, wherein the printing paste includes about 5 to about 30% by weight alumina.

6. The manufacturing method according to claim 1, wherein the green alumina compact includes a binder.

7. The manufacturing method according to claim 1, wherein a purity of an alumina powder for the alumina sintered body and the green alumina compact is greater than or equal to about 99.5 %.

8. The manufacturing method according to claim 1, wherein the green alumina compact, the metallic member, and the alumina sintered body are sintered together by hot pressing at a sintering temperature of about 1400° C. to about 1650° C.

9. The manufacturing method according to claim 1, wherein the green alumina compact is formed by filling an alumina powder on the metallic member and pressing the alumina powder in a metal mold.

* * * * *